C. J. FOX.
HORSE-COLLAR.
No. 181,161.             Patented Aug. 15, 1876.
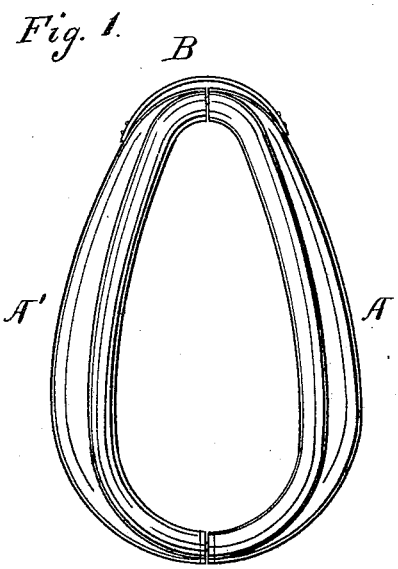
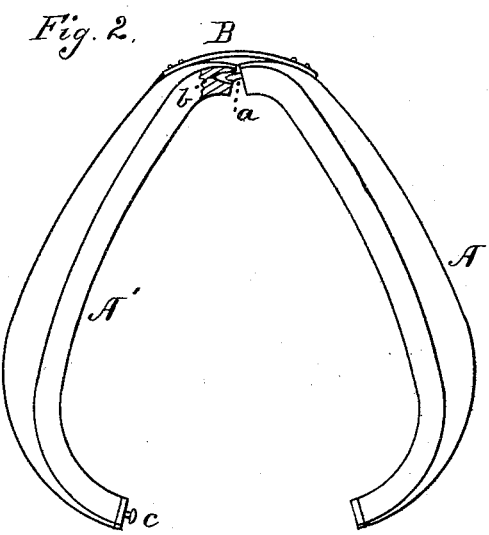
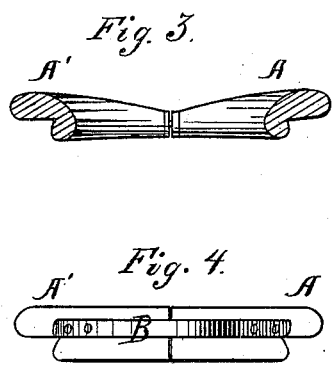
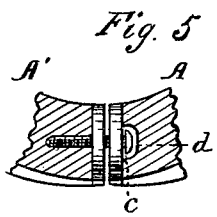
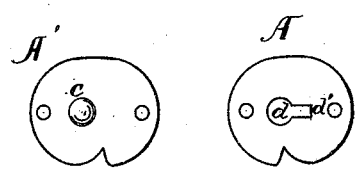
WITNESSES
Thomas Bernard
Wm. Hister
Charles J. Fox
INVENTOR
Edson Bros.

UNITED STATES PATENT OFFICE.

CHARLES J. FOX, OF FOND DU LAC, WISCONSIN, ASSIGNOR OF ONE-HALF HIS RIGHT TO NORMAN LYONS.

IMPROVEMENT IN HORSE-COLLARS.

Specification forming part of Letters Patent No. 181,161, dated August 15, 1876; application filed June 3, 1876.

*To all whom it may concern:*

Be it known that I, CHARLES J. FOX, of Fond du Lac, in the county of Fond du Lac and State of Wisconsin, have invented certain new and useful Improvements in Horse-Collars; and I do hereby declare that the following is a full, clear, and exact description thereof, which will enable others skilled in the art to which it appertains to make and use the same, reference being had to the accompanying drawings, and to the letters of reference marked thereon, which form a part of this specification, and in which—

Figure 1 is a view, in elevation, of my improved horse-collar; Fig. 2, a similar view of the same, having its sections or parts spread apart at their lower ends to permit of adjustment to the neck of the horse or animal; and Figs. 3, 4, and 5 are detached views thereof.

Corresponding parts in the several figures are designated by like letters.

This invention relates to a certain improvement in horse-collars; and it consists in connecting the parts together by means substantially as hereinafter described and claimed.

In the annexed drawing, A A refer to the two parts or sections of the collar, made in the usual way. At the upper end of the section or part A is a dowel or pin, $a$, entering a socket, $b$, in the upper end of the section A′, to prevent lateral movement of the parts. The entrance of the socket $b$ is flared outwardly to allow the dowel or pin $a$ to have a limited amount of movement in the arc of a circle when the sections or parts are spread apart for adjustment to the neck of the horse or animal. To impart flexibility to the upper end of the collar and automatically bring the lower ends of the sections thereof together after its adjustment to the animal's neck, a bowed (preferably flat) spring, B, is attached to the upper ends of the said sections or parts, substantially as shown. In the lower end of the section A′ of the collar is a threaded button-headed pin, $c$, which engages with or enters a slotted orifice, $d\ d'$, in fastening the sections or parts together upon the animal's neck. By turning the screw or pin $c$ so as to remove its head from the section A′, and causing it to enter the orifice or socket $d\ d'$, the size of the collar may be enlarged or varied, adapting it to different-sized necks.

Having thus described my invention, what I claim, and desire to secure by Letters Patent, is—

The sections or parts A A′ of a horse-collar, having a dowel or pin, $a$, and a socket, $b$, and connected together by a spring, B, substantially as and for the purpose set forth.

In testimony that I claim the foregoing as my own I hereunto affix my signature in presence of two witnesses.

CHARLES J. FOX.

Witnesses:
GEO. W. CARTER,
JAMES H. LYONS.